United States Patent
Adzic et al.

(10) Patent No.: US 7,632,601 B2
(45) Date of Patent: Dec. 15, 2009

(54) PALLADIUM-COBALT PARTICLES AS OXYGEN-REDUCTION ELECTROCATALYSTS

(75) Inventors: Radoslav Adzic, East Setauket, NY (US); Tao Huang, Manorville, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 721 days.

(21) Appl. No.: 11/054,587

(22) Filed: Feb. 10, 2005

(65) Prior Publication Data

US 2006/0177728 A1  Aug. 10, 2006

(51) Int. Cl.
*H01M 4/90* (2006.01)
*H01M 8/10* (2006.01)

(52) U.S. Cl. .......................... 429/44; 502/101
(58) Field of Classification Search ............... 429/44; 502/101
See application file for complete search history.

(56) References Cited

U.S. PATENT DOCUMENTS

| | | | |
|---|---|---|---|
| 4,031,292 | A | 6/1977 | Hervert |
| 4,407,907 | A | 10/1983 | Takamura et al. |
| 4,522,894 | A | 6/1985 | Hwang et al. |
| 4,569,924 | A | 2/1986 | Ozin et al. |
| 4,677,092 | A * | 6/1987 | Luczak et al. ............ 502/185 |
| 4,735,772 | A | 4/1988 | van der Zel |
| 4,997,729 | A | 3/1991 | Hatoh et al. |
| 5,429,583 | A | 7/1995 | Paulus et al. |
| 5,910,378 | A * | 6/1999 | Debe et al. .................. 429/42 |
| 6,007,934 | A | 12/1999 | Auer et al. |
| 6,232,264 | B1 | 5/2001 | Lukehart et al. |
| 6,670,301 | B2 | 12/2003 | Adzic et al. |
| 6,783,569 | B2 | 8/2004 | Cheon et al. |
| 6,846,345 | B1 * | 1/2005 | Keller et al. .................. 75/255 |
| 7,179,338 | B2 * | 2/2007 | Guruswamy et al. ........ 148/108 |
| 2003/0140731 | A1 * | 7/2003 | Bocarsly et al. ............ 75/370 |
| 2004/0161641 | A1 * | 8/2004 | Lee et al. ..................... 429/12 |
| 2005/0085379 | A1 * | 4/2005 | Ishihara et al. ............. 502/180 |
| 2006/0135359 | A1 * | 6/2006 | Adzic et al. ................. 502/326 |
| 2006/0264321 | A1 | 11/2006 | Fernandez et al. |
| 2006/0264322 | A1 | 11/2006 | Manthiram et al. |

FOREIGN PATENT DOCUMENTS

| | | |
|---|---|---|
| WO | 2006/135396 A2 | 12/2006 |
| WO | 2006/135396 A3 | 12/2006 |

OTHER PUBLICATIONS

Savadogo et al. "New palladium alloys catalyst for the oxygen reduction reaction in an acid medium" Electrochemical Communications, vol. 6, Issue 2, Feb. 2004, pp. 105-109.*
Jos L. Fernandez et al. "Thermodynamic guidelines for the design of bimetallic catalysts for oxygen electroreduction and rapid screening by scanning electrochemical microscopy. M-Co (M: Pd, Ag, Au)" J. Am. Chem. Soc., 127, Web publication date of Dec. 9, 2005, pp. 357-365.*
Bergeret, G, et al., *Nanoscience and Interfaces*, http://catalyse.univ-lyon1.fr/nanosci3g.htm.
Brankovic, S. R., et al., *Electrochem. Solid State Lett..* 4: A217-A220 (2001).
Brankovic, S. R., et al., *J. Electroanal. Chem.*, 503: 99-104 (2001).
Constant, F.W., *Phys. Rev.*, 36: 1654-1660 (1930).
Freund, H.-J., *Chemical Record*, 3: 181-200 (2003).
Holmberg, K., *J. Colloid and Interface Science*, 274: 355-364 (2004).
Jacoby, M., *Chemical & Engineering News*, p. 25, Nov. 29, 2004.
Kinoucbi, Y., et al., *J. Dent Res.*, 6: 50-58 (Jan. 1981).
Noronha, F.B., et al., *J. Catalysis*, 186:20-30 (1999).
Noronha, F.B., et al., *J. Catalysis*, 168: 42-50 (1997).
Reade Advanced Materials: "Magnetic Nanoparticles/Nanostructures," http://www.reade.com/Products/Nanomaterials/magnetic-nanoparticle.html.
Solla-Gullon, J., et al., *Electrochem. Commun.*, 4: 716-721 (2002).
Strasser, P. et al., *J. Phys. Chem. B*, 107: 11013-11021 (2003).
Uribe, F. A., *Electrochimica Acta*, 47: 3799-3806 (2002).
Wohlfarth, LXXII. Correspondence, Dept. of Mathematics, Imperial College, London, Ser 7, 45(365): 647-649 (1954).
Xu, Y., et al., *J. Am. Chem. Soc.*, 126: 4717-4725 (2004).
Zhang, J., et al, *J. Phys. Chem. B.*, 108(30): 10955-10964 (2004).
Extended European Search Report P82134EP00 dated Jul. 1, 2009.
International Search Report and International Preliminary Report on Patentability.

* cited by examiner

*Primary Examiner*—Gregg Cantelmo
(74) *Attorney, Agent, or Firm*—Dorene M. Price

(57) ABSTRACT

The present invention relates to palladium-cobalt particles useful as oxygen-reducing electrocatalysts. The invention also relates to oxygen-reducing cathodes and fuel cells containing these palladium-cobalt particles. The invention additionally relates to methods for the production of electrical energy by using the palladium-cobalt particles of the invention.

8 Claims, 3 Drawing Sheets

PALLADIUM-COBALT PARTICLES AS OXYGEN-REDUCTION ELECTROCATALYSTS

This invention was made with Government support under contract number DE-AC02-98CH10886, awarded by the U.S. Department of Energy. The Government has certain rights in the invention.

BACKGROUND OF THE INVENTION

The present invention relates to palladium-cobalt alloy nanoparticles useful as oxygen reduction electrocatalysts in fuel cells. The palladium-cobalt nanoparticles of the present invention have been found to have at least the same catalytic activity as highly expensive platinum nanoparticles while providing a significantly cheaper alternative to platinum.

A "fuel cell" is a device which converts chemical energy into electrical energy. In a typical fuel cell, a gaseous fuel such as hydrogen is fed to an anode (the negative electrode), while an oxidant such as oxygen is fed to the cathode (the positive electrode). Oxidation of the fuel at the anode causes a release of electrons from the fuel into an external circuit which connects the anode and cathode. In turn, the oxidant is reduced at the cathode using the electrons provided by the oxidized fuel. The electrical circuit is completed by the flow of ions through an electrolyte that allows chemical interaction between the electrodes. The electrolyte is typically in the form of a proton-conducting polymer membrane that separates the anode and cathode compartments and which is also electrically insulating. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a typical proton-exchange membrane (PEM) fuel cell, hydrogen is supplied to the anode and oxygen is supplied to the cathode. Hydrogen is oxidized to form protons while releasing electrons into the external circuit. Oxygen is reduced at the cathode to form reduced oxygen species. Protons travel across the proton-conducting membrane to the cathode compartment to react with reduced oxygen species forming water. The reactions in a typical hydrogen/oxygen fuel cell are as follows:

Anode: $2H_2 \rightarrow 4H^+ + 4e^-$     (1)

Cathode: $O_2 + 4H^+ + 4e^- \rightarrow 2H_2O$     (2)

Net Reaction: $2H_2 + O_2 \rightarrow 2H_2O$     (3)

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of either methane or methanol with water along with the application of heat to produce hydrogen along with the byproducts of carbon dioxide and carbon monoxide.

Other fuel cells, known as "direct" or "non-reformed" fuel cells, oxidize fuel high in hydrogen content directly, without the hydrogen first being produced by a reforming process. For example, it has been known since the 1950's that lower primary alcohols, particularly methanol, can be oxidized directly. Accordingly, a substantial effort has gone into the development of the so-called "direct methanol oxidation" fuel cell because of the advantage of bypassing the reformation step.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower overpotentials. Accordingly, in the absence of an electrocatalyst, a typical electrode reaction would occur, if at all, only at very high overpotentials. Due to the high catalytic nature of platinum, supported platinum and platinum alloy materials are preferred as electrocatalysts in the anodes and cathodes of fuel cells.

However, platinum is a prohibitively expensive precious metal. In fact, the required platinum loading using current state-of-the-art electrocatalysts is still too high for commercially viable mass production of fuel cells.

Accordingly, there have been efforts to reduce the amount of platinum in electrocatalysts. For example, platinum nanoparticles have been studied as electrocatalysts (see, for example, U.S. Pat. Nos. 6,007,934; and 4,031,292). In addition, platinum-alloy nanoparticles, such as platinum-palladium alloy nanoparticles, have been studied (see, for example, U.S. Pat. No. 6,232,264; Solla-Gullon, J., et al., "Electrochemical And Electrocatalytic Behaviour Of Platinum-Palladium Nanoparticle Alloys", *Electrochem. Commun.*, 4, 9: 716 (2002); and Holmberg, K., "Surfactant-Templated Nanomaterials Synthesis", *J. Colloid Interface Sci.*, 274: 355 (2004)).

U.S. Pat. No. 6,670,301 B2 to Adzic et al. relates to an atomic monolayer of platinum on ruthenium nanoparticles. The platinum-coated ruthenium nanoparticles are useful as carbon monoxide-tolerant anode electrocatalysts in fuel cells. See also: Brankovic, S. R., et al., "Pt Submonolayers On Ru Nanoparticles—A Novel Low Pt Loading, High CO Tolerance Fuel Cell Electrocatalyst", *Electrochem. Solid State Lett.*, 4, p. A217 (2001); and Brankovic, S. R., et al., "Spontaneous Deposition Of Pt On The Ru(0001) Surface", *J. Electroanal. Chem.*, 503: 99 (2001), which also disclose platinum monolayers on ruthenium nanoparticles.

However, the platinum-based nanoparticles described above still require the presence of costly platinum. In fact, most of the platinum-based nanoparticles currently known still require high loadings of platinum.

Accordingly, there is a need for new non-platinum electrocatalysts having electrocatalytic oxygen reduction capabilities comparable to platinum or its alloys. None of the art discussed above disclose non-platinum nanoparticle electrocatalysts with oxygen-reducing electrocatalytic activity similar to platinum. The present invention relates to such non-platinum oxygen reduction electrocatalysts.

SUMMARY OF THE INVENTION

The present invention relates to palladium-cobalt particles and their use as oxygen reduction electrocatalysts. The palladium-cobalt electrocatalysts are particularly useful as oxygen-reducing cathode components in fuel cells.

Accordingly, in one embodiment, the invention relates to a fuel cell having an oxygen-reducing cathode containing the palladium-cobalt particles bound to an electrically conductive support. The electrically conductive support in the fuel cell is preferably carbon black, graphitized carbon, graphite, or activated carbon.

In the fuel cell, the oxygen-reducing cathode is connected with the anode through an electrical conductor. The fuel cell further contains an anode and an ion-conducting medium, preferably a proton-conducting medium. The proton-conducting medium mutually contacts the oxygen-reducing cathode and the anode. The fuel cell generates energy when the anode is in contact with a fuel source and when the cathode is in contact with oxygen.

Some contemplated fuel sources for the fuel cell described above are, for example, hydrogen gas, an alcohol such as methanol or ethanol, methane, and gasoline. In addition, the alcohol, methane, or gasoline may be unreformed, or may alternatively be reformed to produce the corresponding reformate, e.g., methanol reformate.

Oxygen gas may be supplied to the oxygen-reducing cathode in the form of pure oxygen gas. More preferably, the oxygen gas is supplied as air. Alternatively, oxygen gas may be supplied as a mixture of oxygen and one or more inert gases.

Preferably, the palladium-cobalt particles in the fuel cell described above are palladium-cobalt nanoparticles. The palladium-cobalt nanoparticles preferably have a size of about three to ten nanometers. More preferably, the palladium-cobalt nanoparticles have a size of about five nanometers.

The palladium-cobalt nanoparticles are composed, minimally, of palladium and cobalt. For example, in one embodiment, palladium and cobalt are in a palladium-cobalt binary alloy corresponding to the formula $Pd_{1-x}Co_x$, wherein x has a minimum value of about 0.1 and a maximum value of about 0.9. More preferably, x has a minimum value of about 0.2 and a maximum value of about 0.6. More preferably, x has a value of about 0.5. Even more preferably, x has a value of about 0.3.

In a further embodiment, the palladium-cobalt nanoparticles further include one or more metals other than palladium or cobalt to make higher alloys. Preferably, the one or more metals other than palladium or cobalt are transition metals. More preferably, the transition metals are 3d transition metals.

In one embodiment, the palladium-cobalt nanoparticles are ternary alloy nanoparticles composed of palladium, cobalt, and a metal other than palladium or cobalt. For example, the ternary alloy nanoparticles may be composed of palladium, cobalt, and a 3d transition metal other than palladium or cobalt. The ternary alloy composition may be represented by the formula $Pd_{1-x-y}Co_xM_y$, wherein M is a 3d transition metal other than palladium or cobalt. More preferably, M is selected from the group consisting of nickel and iron. The sum of x and y preferably has a minimum value of about 0.1 and a maximum value of about 0.9.

In another embodiment, the palladium-cobalt nanoparticles are quaternary alloy nanoparticles composed of palladium, cobalt, and two metals other than palladium or cobalt. The quaternary alloy composition may be represented by the formula $Pd_{1-x-y-z}Co_xM_yR_z$, wherein M and R each independently represent a transition metal other than cobalt. The sum of x, y, and z preferably has a minimum value of about 0.1 and a maximum value of about 0.9.

In the palladium-cobalt particles, the palladium and cobalt may be in either a homogeneous phase, a heterogeneous phase, or a combination of both.

In a homogeneous palladium-cobalt phase, the palladium and cobalt are distributed uniformly on a molecular level throughout the particle. In a heterogeneous palladium-cobalt phase, the palladium and the cobalt are distributed non-uniformly in the particle. For example, in one embodiment, the palladium-cobalt nanoparticles are composed of a palladium core coated and a cobalt shell. In another embodiment, palladium-cobalt nanoparticles are composed of a cobalt core coated with a palladium shell.

The invention additionally relates to methods for producing electrical energy using the palladium-cobalt particles described above. The method includes contacting an oxygen-reducing cathode of the fuel cell described above with oxygen and contacting an anode of the fuel cell described above with a fuel source.

In another embodiment, the invention relates to a method for reducing oxygen gas. In one embodiment, the method uses the palladium-cobalt nanoparticles described above to reduce oxygen gas. The palladium-cobalt nanoparticles may be in the form of a solid, or alternatively, dispersed or suspended in a liquid phase when contacting oxygen gas. In another embodiment, the palladium-cobalt nanoparticles are bound to a support when reducing oxygen gas.

The invention enables oxygen-reducing electrocatalysts in fuel cells to be constructed without the use of costly platinum in the oxygen-reducing cathode. The palladium-cobalt oxygen-reducing electrocatalysts of the invention do not contain platinum, and yet, advantageously possess similar oxygen-reducing catalytic activity to platinum-based electrocatalysts.

DETAILED DESCRIPTION OF THE INVENTION

Figure 1:
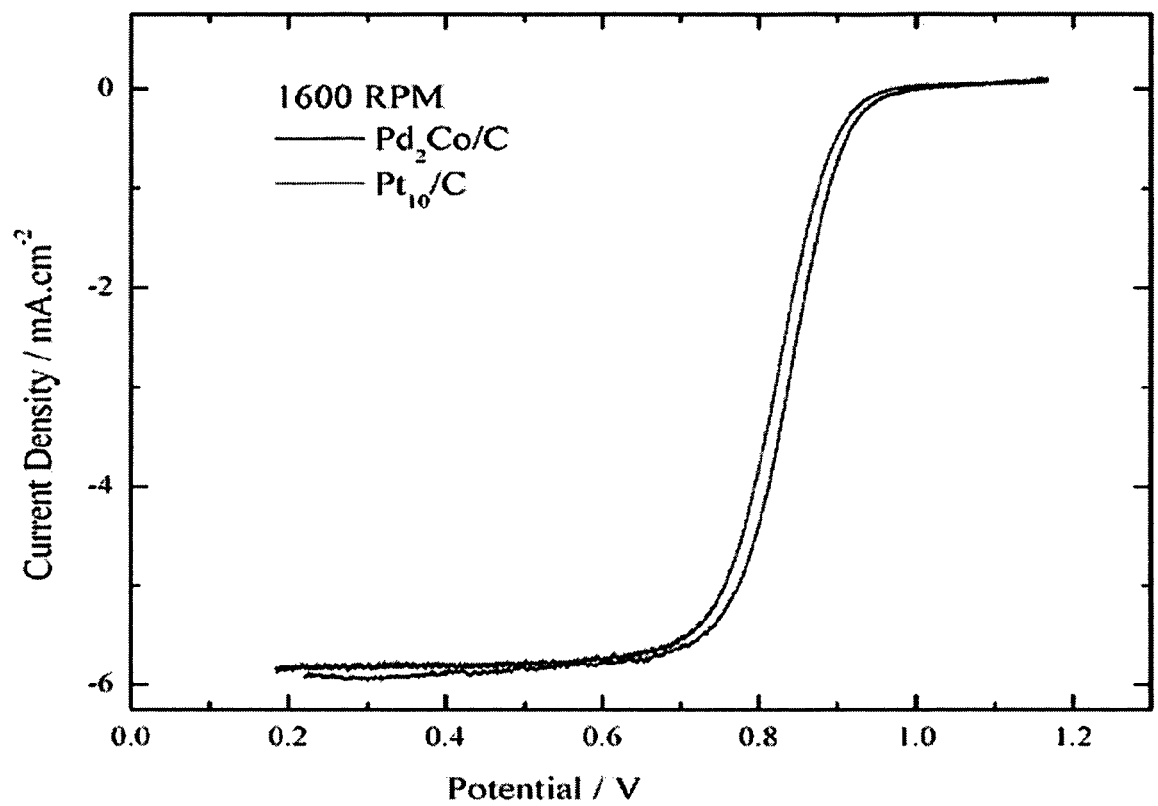
FIG. 1. Comparison of the polarization curves for oxygen reduction kinetics on $Pd_2Co/C$ and $Pt_{10}/C$ in 0.1M $HClO_4$ solution on a rotating disk electrode at a rotation rate of 1600 rpm.

One embodiment of the invention relates to palladium-cobalt particles which function as oxygen-reducing electrocatalysts.

The palladium-cobalt particles are composed, minimally, of zerovalent palladium and zerovalent cobalt. For example, in one embodiment, the palladium-cobalt particles are composed of a palladium-cobalt binary alloy.

A palladium-cobalt binary alloy may be represented by the formula $Pd_nCo$ (1). In formula (1), n represents the number of palladium atoms per cobalt atom, i.e., the ratio Pd:Co (n:1). Accordingly, $Pd_2Co$ represents a binary alloy having a stoichiometric composition of two palladium atoms per cobalt atom (PdCo 2:1). Similarly, $Pd_4Co$ represents a binary alloy having a stoichiometric composition of four palladium atoms per cobalt atom (PdCo 4:1).

Alternatively, such a palladium-cobalt binary alloy may be represented by the formula $Pd_{1-x}Co_x$ (2). Formula (2) is related to formula (1) in that x is equivalent to $1/(n+1)$. Accordingly, $Pd_2Co$ according to formula (1) corresponds approximately to $Pd_{0.67}Co_{0.33}$ according to formula (2). In other words, a stoichiometric composition of 2:1 Pd:Co ($Pd_2Co$) corresponds approximately to a molar composition of 67% Pd and 33% Co ($Pd_{0.67}Co_{0.33}$). Similarly, $Pd_3Co$ corresponds to $Pd_{0.75}Co_{0.25}$ (molar composition of 75% Pd and 25% Co) and $Pd_4Co$ corresponds to $Pd_{0.8}Co_{0.2}$ (a molar composition of 80% Pd and 20% Co).

In formula (2), the value of x is not particularly limited. Preferably, x has a minimum value of about 0.01, more preferably 0.05, more preferably 0.1, and even more preferably, a minimum value of about 0.2. Preferably, x has a maximum value of about 0.99, more preferably a value of about 0.9, more preferably a value of about 0.6, and even more preferably, a maximum value of about 0.5. For example, in a preferred embodiment, x has a minimum value of about 0.2 and a maximum value of about 0.6. In a more preferred embodiment, x has a minimum value of about 0.2 and a maximum value of about 0.5.

Some examples of palladium-cobalt binary alloys include $Pd_{0.1}Co_{0.9}$, $Pd_{0.2}Co_{0.8}$, $Pd_{0.3}Co_{0.7}$, $Pd_{0.4}Co_{0.6}$, $Pd_{0.5}Co_{0.5}$ (i.e., PdCo), $Pd_{0.6}Co_{0.4}$, $Pd_{0.67}Co_{0.33}$ (i.e., $Pd_2Co$), $Pd_{0.7}Co_{0.3}$, $Pd_{0.75}Co_{0.25}$ (i.e., $Pd_3Co$), $Pd_{0.8}Co_{0.2}$ (i.e., $Pd_4Co$), and $Pd_{0.9}Co_{0.1}$. Preferably, the palladium cobalt binary alloy phase is $Pd_{0.7}Co_{0.3}$ or $Pd_{0.67}Co_{0.33}$ ($Pd_2Co$).

The binary alloy palladium-cobalt particles discussed above may further include one or more additional zerovalent metals other than palladium and cobalt to make higher alloys. The number of additional metals other than palladium and cobalt is not particularly limited in the present invention. Accordingly, ternary alloys, quaternary alloys, pentenary alloys, and higher alloys are all within the scope of the present invention.

Suitable additional metals may be essentially any metal or combination of metals other than palladium and cobalt. For example, the one or more additional metals may be selected from the alkali, alkaline earth, main group, transition, lanthanide, and actinide classes of metals.

Some examples of suitable alkali metals include lithium (Li), sodium (Na), potassium (K), and rubidium (Rb). Some examples of suitable alkaline earth metals include berrylium (Be), magnesium (Mg), calcium (Ca), strontium (Sr), and barium (Ba). Some examples of suitable main group metals include boron (B), aluminum (Al), gallium (Ga), indium (In), carbon (C), silicon (Si), germanium (Ge), nitrogen (N), phosphorus (P), arsenic (As), antimony (Sb), sulfur (S), selenium (Se), and tellurium (Te).

Some suitable examples of transition metals include the 3d transition metals (the row of transition metals starting with scandium (Sc)); the 4d transition metals (the row of transition metals starting with Yttrium (Y); and the 5d transition metals (the row of transition metals starting with hafnium (Hf)). Some examples of suitable 3d transition metals include titanium (Ti), vanadium (V), chromium (Cr), manganese (Mn), iron (Fe), nickel (Ni), copper (Cu), and zinc (Zn). Some examples of suitable 4d transition metals include molybdenum (Mo), technetium (Tc), ruthenium (Ru), rhodium (Rh), silver (Ag), and cadmium (Cd). Some examples of suitable 5d transition metals include tantalum (Ta), tungsten (W), rhenium (Re), osmium (Os), iridium (Ir), platinum (Pt), and gold (Au).

Some examples of suitable lanthanide metals include lanthanum (La), cerium (Ce), neodymium (Nd), samarium (Sm), europium (Eu), gadolinium (Gd), and terbium (Tb). Some examples of suitable actinide metals include thorium (Th), proctactinium (Pa), uranium (U), and americium (Am).

Preferably, the one or more additional zerovalent metals for making higher alloys are transition metals other than palladium or cobalt. More preferably, the one or more additional metals are selected from the group of 3d transition metals. Even more preferably, at least one additional metal is either nickel (Ni) or iron (Fe). Gold (Au) is another preferred additional metal.

In one embodiment, the palladium-cobalt particles include a single additional zerovalent metal to make a ternary alloy. Such a ternary alloy may be represented by the formula $Pd_{1-x-y}Co_xM_y$ (3). In formula (3), M is any of the metals previously described as suitable. Preferably, M is a 3d transition metal. More preferably, M is either nickel or iron. The values of x and y are not particularly limited. Preferably, x and y each independently have a value of about 0.01 to a value of about 0.99. More preferably, x and y each independently have a value of about 0.1 to a value of about 0.9. By the rules of chemistry, the sum of x and y in formula (3) must be less than 1. Preferably, the sum of x and y has a minimum value of about 0.1 and a maximum value of about 0.9.

Some examples of ternary alloy compositions include the palladium-cobalt-iron (Pd—Co—Fe) and palladium-cobalt-nickel (Pd—Co—Ni) classes of ternary alloys. Some specific examples of palladium-cobalt-iron ternary alloys include $Pd_{0.1}Co_{0.5}Fe_{0.4}$, $Pd_{0.2}Co_{0.4}Fe_{0.4}$, $Pd_{0.3}Co_{0.5}Fe_{0.2}$, $Pd_{0.4}Co_{0.3}Fe_{0.3}$, $Pd_{0.5}Co_{0.25}Fe_{0.25}$, $Pd_{0.6}Co_{0.3}Fe_{0.1}$, $Pd_{0.7}Co_{0.2}Fe_{0.1}$, $Pd_{0.75}Co_{0.2}Fe_{0.05}$, $Pd_{0.8}Co_{0.1}Fe_{0.1}$, $Pd_{0.8}Co_{0.19}Fe_{0.01}$, and $Pd_{0.9}Co_{0.05}Fe_{0.05}$. Some specific examples of palladium-cobalt-nickel ternary alloys include $Pd_{0.1}Co_{0.5}Ni_{0.4}$, $Pd_{0.2}Co_{0.4}Ni_{0.4}$, $Pd_{0.3}Co_{0.5}Ni_{0.2}$, $Pd_{0.4}Co_{0.3}Ni_{0.3}$, $Pd_{0.5}Co_{0.25}Ni_{0.25}$, $Pd_{0.6}Co_{0.3}Ni_{0.1}$, $Pd_{0.7}Co_{0.2}Ni_{0.1}$, $Pd_{0.75}Co_{0.2}Ni_{0.05}$, $Pd_{0.8}Co_{0.1}Ni_{0.1}$, $Pd_{0.8}Co_{0.19}Ni_{0.01}$, and $Pd_{0.9}Co_{0.05}Ni_{0.05}$.

In another embodiment, the palladium-cobalt particles include a combination of two additional zerovalent metals to make a quaternary alloy. Such a quaternary alloy may be represented by the formula $Pd_{1-x-y-z}Co_xM_yR_z$ (4). In formula (4), M and R are any of the metals previously described as suitable. Preferably, M and R are 3d transition metals. Most preferably, M and R are nickel and iron. The values of x, y, and z are not particularly limited. Preferably, x, y, and z each independently have a value of about 0.01 to a value of about 0.99. More preferably, x, y, and z each independently have a value of about 0.1 to a value of about 0.9. By the rules of chemistry, the sum of x, y, and z in formula (4) must be less than 1. Preferably, the sum of x, y, and z has a minimum value of about 0.1 and a maximum value of about 0.9.

An example of a quaternary alloy composition is the palladium-cobalt-iron-nickel (Pd—Co—Fe—Ni) class of quaternary alloys. Some specific examples of palladium-cobalt-iron-nickel quaternary alloys include $Pd_{0.1}Co_{0.5}Fe_{0.2}Ni_{0.2}$, $Pd_{0.2}Co_{0.4}Fe_{0.2}Ni_{0.2}$, $Pd_{0.3}Co_{0.5}Fe_{0.1}Ni_{0.1}$, $Pd_{0.4}Co_{0.3}Fe_{0.2}Ni_{0.1}$, $Pd_{0.5}Co_{0.25}Fe_{0.2}Ni_{0.05}$, $Pd_{0.6}Co_{0.3}Fe_{0.05}Ni_{0.05}$, $Pd_{0.7}Co_{0.2}Fe_{0.05}Ni_{0.05}$, $Pd_{0.75}Co_{0.2}Fe_{0.03}Ni_{0.02}$, $Pd_{0.8}Co_{0.1}Fe_{0.05}Ni_{0.05}$, $Pd_{0.8}Co_{0.15}Fe_{0.03}Ni_{0.02}$, $Pd_{0.9}Co_{0.05}Fe_{0.01}Ni_{0.04}$, and $Pd_{0.9}Co_{0.05}Fe_{0.04}Ni_{0.01}$.

The palladium-cobalt binary alloys can be in a homogeneous phase. In a homogeneous palladium-cobalt phase, the palladium and cobalt are distributed uniformly on a molecular level throughout the particle.

Alternatively, the palladium-cobalt binary alloys can be in a heterogeneous phase. In a heterogeneous palladium-cobalt phase, the palladium and the cobalt are distributed non-uniformly in the particle. For example, in a heterogeneous palladium-cobalt phase, individual grains of palladium may be intermingled with individual grains of cobalt throughout the palladium-cobalt particle. Alternatively, in a heterogeneous palladium-cobalt phase, a palladium core may be surrounded by a shell of cobalt, or vice versa.

The heterogeneous palladium-cobalt binary alloy discussed above may include any of the additional metals described above to make heterogeneous ternary, quaternary, and higher alloys containing palladium and cobalt. For example, a heterogeneous ternary or quaternary alloy may include individual grains of palladium and cobalt intermingled with grains of one or more other metals such as nickel and iron. Alternatively, a heterogeneous ternary or quaternary alloy may include a core of another metal such as nickel, iron, gold, silver, or ruthenium surrounded by a heterogeneous core of palladium and cobalt.

Alternatively, a heterogeneous palladium-cobalt alloy may be composed of either a homogeneous or heterogeneous palladium-cobalt phase and a non-zerovalent metal component. Some non-zerovalent metal components include metal carbides, metal nitrides, metal phosphides, metal sulfides, metal oxides, and organic materials. Some examples of metal carbides include silicon carbide and vanadium carbide. Some examples of metal nitrides include gallium nitride and titanium nitride. Some examples of metal phosphides include gallium phosphide and iron phosphide. Some examples of metal oxides include silicon oxide, titanium oxide, iron oxide, aluminum oxide, tungsten oxide, and lithium oxide. Some examples of organic materials include plastics and polymers.

Accordingly, a heterogeneous palladium-cobalt particle may be composed of a homogeneous or heterogeneous palladium-cobalt shell on, for example, a silicon oxide core, a silicon nitride core, a titanium oxide core, an aluminum oxide core, an iron oxide core, a metal salt core, a polymer core, a carbon core, and so on.

In addition, a palladium-cobalt particle can have a combination of a homogeneous component and a heterogeneous component. An example of such a palladium-cobalt particle is one that contains a homogeneous core of palladium-cobalt bonded to a shell of cobalt. Another example of such a palladium-cobalt particle is one that contains a homogeneous phase of palladium-cobalt within one or more interlayers of palladium or cobalt.

The palladium-cobalt particles can have any of several morphologies. For example, the particles can be approximately spherical, cubooctahedral, rod-shaped, cuboidal, pyramidal, amorphous, and so on.

The palladium-cobalt particles can also be in any of several arrangements. The particles may be, for example, agglomerates, micelles, ordered arrays, as a guest in a host such as a zeolite or patterned polymer, and so on.

The size of the palladium-cobalt particles is not particularly limited. For example, in one embodiment, the size of the palladium-cobalt particles is in the nanoscale range of a few nanometers to approximately a hundred nanometers. In another embodiment, the size of the particles is hundreds of nanometers to tens or hundreds of microns, i.e., microparticles. In yet another embodiment, the size of the particles range from hundreds of microns to several millimeters in size.

The minimum size of the palladium-cobalt particles is preferably 1 micron, more preferably 500 nanometers, more preferably 100 nanometers, and even more preferably 10 nanometers. The maximum size of the particles is preferably 1 millimeter, more preferably 500 microns, more preferably 100 microns, and even more preferably 10 microns.

The palladium-cobalt particles may have on their surface some trace chemicals. Some examples of trace chemicals include oxides, halogens, carbon monoxide, and so on, as long as such trace chemicals do not obviate the intended use of the particle. For example, for use in fuel cells, it is preferred that the particles do not contain surface oxides or carbon monoxide.

The palladium-cobalt particles can be synthesized by various means. Some methods known in the art for synthesizing such particles include reductive chemical methods in a liquid phase, chemical vapor deposition (CVD), thermal decomposition, physical vapor deposition (PVD), reactive sputtering, electrodeposition, laser pyrolysis, and sol gel techniques.

For example, in one embodiment, palladium particles, preferably nanoparticles, are suspended in a solution containing a cobalt salt, to which a suitable reductant is added. The reductant must be capable of reducing oxidized cobalt. The reduction of cobalt onto the palladium nanoparticles affords, at least initially, cobalt-coated palladium nanoparticles. Essentially any cobalt salt is suitable for the present invention. Some examples of suitable cobalt salts include cobalt (II) chloride, cobalt (II) acetate, cobalt (II) carbonate, cobalt (II) nitrate, and cobalt (II) sulfate. Some suitable reductants for reducing cobalt (II) include the borohydrides, hypophosphites, and hydrazine. Some examples of borohydrides include sodium borohydride, lithium borohydride, and lithium aminoborohydrides. Some examples of hypophosphites include sodium hypophosphite and hyposphosphorous acid.

Alternatively, cobalt nanoparticles may be suspended in a solution containing a palladium salt. The palladium ions in the palladium salt are spontaneously reduced by the cobalt nanoparticles since palladium has a much more positive reduction potential than cobalt. The spontaneous reduction of palladium affords, at least initially, palladium-coated cobalt nanoparticles. Essentially any palladium salt is suitable for the present invention. Some examples of suitable palladium salts include tetraminepalladium (II) chloride, palladium (II) chloride, palladium (II) acetylacetonate, palladium (II) cyanide, palladium (II) acetate, and palladium (II)sulfate.

The diffusion ability of palladium into cobalt and of cobalt into palladium is typically fairly high under normal conditions. Accordingly, under normal conditions, any initially produced cobalt-coated palladium or palladium-coated cobalt particles gradually reorganize into particles having homogeneous alloys of palladium and cobalt. The rate of transformation to a palladium-cobalt homogeneous alloy is dependent on several factors, most notably temperature. The higher the temperature at which such heterogeneous palladium-cobalt particles are exposed, the faster such particles transform into a homogeneous phase of palladium and cobalt. In fact, such heterogeneous palladium-cobalt particles may be purposefully exposed to a high temperature step in order to more quickly transform the particles into a homogeneous palladium-cobalt phase.

In another embodiment, palladium-cobalt nanoparticles are prepared by reducing a solution containing a mixture of a palladium salt and a cobalt salt. The reductant is capable of reducing both palladium and cobalt metal ions. Since cobalt is more difficult to reduce than palladium, the reductants described above for cobalt apply to the current embodiment as well.

In another embodiment, palladium-cobalt nanoparticles are prepared by suspending palladium nanoparticles into a solution containing a cobalt (II) salt. Preferably, the palladium nanoparticles are bonded to a carbon support. The liquid phase of the resulting suspension is then removed by evaporation leaving behind a mixture of palladium nanoparticles and the dry cobalt (II) salt. The dried mixture is then heated or calcined in air, and/or annealed at a high temperature in the presence of hydrogen for an amount of time suitable for completely reducing cobalt (II). A suitable temperature for heating, calcining, or annealing may be, for example, 400 to 800 degrees Celsius. A suitable amount of time for heating or annealing under such temperatures may be, for example, one to four hours.

In an alternative form of the above embodiment, a palladium salt and a cobalt salt are mixed in a solution. The liquid phase of the solution is removed by evaporation, leaving behind a dried mixture of the palladium and cobalt salts. The dried mixture is then heated, annealed, or calcined, as described above.

In yet another embodiment, vapor or plasma containing ionized or zerovalent cobalt atoms is contacted with palladium particles to deposit a layer of cobalt onto the palladium particles. Alternatively, a vapor or plasma containing ionized or zerovalent palladium atoms is contacted with cobalt particles to deposit a layer of palladium onto the cobalt particles. Alternatively, a vapor or plasma containing both cobalt and palladium is allowed to condense to form particles of a homogeneous alloy of palladium and cobalt.

In any of the embodiments described above for synthesizing the palladium-cobalt particles, any other suitable metal, mixture of metals, metal salt, or mixture of metal salts other than palladium or cobalt may be added to make ternary, quaternary, and higher alloy particles. For example, to a suspension of palladium nanoparticles in a liquid phase may be added a cobalt salt and a nickel salt. Upon reduction with a suitable reductant, Pd—Co—Ni particles are produced. Or, for example, a palladium salt, cobalt salt, and nickel salt; or alternatively, a palladium salt, cobalt salt, and iron salt; or alternatively, a palladium salt, cobalt salt, iron salt and nickel salt, may be mixed in solution, the liquid phase removed, and the dried mixture heated and/or annealed to produce Pd—Co—Ni, Pd—Co—Fe, and Pd—Co—Ni—Fe particles, respectively.

The palladium-cobalt particles may be in any suitable form. For example, the particles may be in a solid form, e.g., a powder. The powder may be unsupported or alternatively, bound to a support.

The support may be any suitable support. For example, the support may be carbon, alumina, silica, silica-alumina, titania, zirconia, calcium carbonate, barium sulphate, a zeolite, interstitial clay, and so on.

The palladium-cobalt particles may also be suspended or dispersed in a liquid phase. The liquid phase may be any suitable liquid phase. For example, the liquid phase may be aqueous-based. The aqueous-based liquid phase may be completely water, or may include another suitable solvent. For example, the aqueous-based liquid phase may be a water-alcohol mixture.

Alternatively, the liquid phase may include an organic solvent. Some examples of suitable organic solvents include acetonitrile, dimethylsulfoxide, dimethylformamide, toluene, methylene chloride, chloroform, hexanes, glyme, diethyl ether, and the like.

The palladium-cobalt particles may also include, when appropriate, any suitable metal-bonding ligands or surfactants bound to, or associated with, the surface of the palladium-cobalt particles. Some examples of metal-bonding ligands include phosphines, amines, and thiols. Some more specific examples of metal-bonding ligands include trialkylphosphines, triphenylphosphines and derivatives therefrom, diphosphines, pyridines, trialkylamines, diamines such as ethylenediaminetetraacetic acid (EDTA), thiophenol, alkylmercaptans, and alkyleneoxy, ethyleneoxy and poly(ethyleneoxy) derivatives therefrom, and so on. Some examples of surfactants include polyvinylalcohol, polyvinylpyrrolidinone, albumin, polyethyleneglycols, sodium dodecyl sulfate, fatty acid salts, and the like.

A further embodiment of the invention relates to an oxygen-reducing cathode containing the palladium-cobalt particles described above. Another further embodiment of the invention relates to a fuel cell containing the palladium-cobalt particles and/or oxygen-reducing cathode described above.

When used in an oxygen-reducing cathode or as oxygen reduction electrocatalysts in fuel cells, the size of the palladium-cobalt particles is preferably a few nanometers to several hundred nanometers, i.e., nanoparticles. In addition, for the foregoing applications, the size of the palladium-cobalt particles is critical. As the size of the particles decrease, the particles tend to become increasingly susceptible to oxidation. On the other hand, as the size of the particles increase, the surface area of the particles decrease. The decrease in surface area causes a concomitant decrease in catalytic activity and efficiency.

Accordingly, the palladium-cobalt particles are preferably nanoparticles with a minimum size of about 3 nanometers, and more preferably a minimum size of about 5 nanometers. The palladium-cobalt nanoparticles preferably have a maximum size of about 500 nanometers, more preferably a maximum size of 100 nanometers, even more preferably a maximum size of about 50 nanometers, and most preferably a maximum size of about 10 nanometers.

Accordingly, in one embodiment, the palladium-cobalt nanoparticles have a minimum size of about 3 nanometers and a maximum size of about 10 nanometers. The maximum size of the palladium-cobalt nanoparticles is preferably no more than about 12 nanometers. The nanoparticles most preferably have a size of about 5 nanometers.

When applied as oxygen-reducing electrocatalysts in fuel cells, the support is preferably electrically conductive. Some examples of electrically conductive supports include carbon black, graphitized carbon, graphite, and activated carbon. The electrically conductive support material is preferably finely divided.

The fuel cell of the invention includes an oxygen-reducing cathode having palladium-cobalt particles described above, preferably bound to an electrically conductive support. The fuel cell also includes an anode for oxidizing fuels. An electrical conductor connects the cathode and anode, thereby permitting electrical contact between the cathode and the anode.

The oxygen-reducing cathode and the anode in the fuel cell are also in mutual contact with an ion-conducting medium. Preferably, the ion-conducting medium is a proton-conducting medium. The proton-conducting medium conducts only protons, and accordingly, separates the fuel from the oxygen. The proton-conducting medium may be in any of several suitable forms, for example, a liquid, solid, or semi-solid. A preferred proton-conducting membrane is the perfluorinated polymer NAFION®.

The anode of the fuel cell may be any of the anodes known in the art. For example, the anode may be supported or unsupported platinum or platinum-alloys. The anode may also include a carbon monoxide-tolerant electrocatalyst. Such carbon monoxide tolerant anodes include numerous platinum alloys. A notable carbon monoxide-tolerant anode containing an atomically thin layer of platinum on ruthenium nanoparticles has been disclosed by Adzic et al. (U.S. Pat. No. 6,670, 301 B2). The foregoing patent by Adzic et al. is included herein by reference in its entirety.

In addition, the oxygen-reducing cathode and/or fuel cell of the invention, as described above, may be a component of a device, particularly an electronic device. For example, the oxygen-reducing cathode or fuel cell may function to produce electrical energy in a laptop computer, cell phone, automobile, and in spacecraft. A fuel cell in such devices may provide the advantages of being compact, light weight, and have few moving parts.

In a further embodiment, the invention relates to a method for producing electrical energy by supplying the fuel cell as described above with an oxygen source and a fuel source. The fuel cell, as described, becomes operational, i.e., generates electrical energy, when the oxygen-reducing cathode is in contact with oxygen gas and the anode is in contact with a fuel source.

Oxygen gas may be supplied to the oxygen-reducing cathode in the form of pure oxygen gas. More preferably, the oxygen gas is supplied as air. Alternatively, oxygen gas may be supplied as a mixture of oxygen and one or more other inert gases. For example, oxygen may be supplied as oxygen-argon or oxygen-nitrogen mixtures.

Some contemplated fuel sources include, for example, hydrogen gas and alcohols. Some examples of suitable alcohols include methanol and ethanol. The alcohol may be unreformed or reformed. An example of a reformed alcohol is methanol reformate. Examples of other fuels include methane, gasoline, formic acid, and ethylene glycol. The gasoline or methane is preferably reformed to produce fuel more suitable for existing fuel cells.

In another embodiment, the invention relates to a method for reducing oxygen gas. In one embodiment, the method uses the palladium-cobalt particles described above to reduce oxygen gas. When reducing oxygen, the palladium-cobalt particles may be in the form of, for example, an unsupported powdery or granular solid, or alternatively, an unsupported dispersion or suspension in a liquid phase. The palladium-cobalt particles may alternatively be bound to a support when reducing oxygen gas.

Examples have been set forth below for the purpose of illustration and to describe the best mode of the invention at the present time. However, the scope of this invention is not to be in any way limited by the examples set forth herein.

EXAMPLE 1

Preparation of Palladium-Cobalt Particles

Method A:

Tetraaminepalladium (II) chloride, $Pd(NH_3)Cl_2 \cdot H_2O$, 23 mg (Alfa Aesar, 99.9%), and 40 mg carbon particles (Vulcan XC-72, E-Tek), were mixed with 200 ml water and sonicated for 15 minutes. A solution of sodium borohydride, $NaBH_4$, 0.1 g (Alfa Aesar, 99.9%) dissolved in 20 ml water, was added to the palladium solution. The mixture was stirred for thirty minutes to complete the reaction. Then the product of carbon supported palladium nanoparticles (Pd/C) was filtered and washed with extra ca. 2-3 liters of water. The following two ratios of palladium to cobalt were used in modifying Pd/C with cobalt:

For 4:1 palladium to cobalt ($Pd_4Co/C$), 50 mg Pd/C and 2.3 ml 0.01M of an aqueous solution of cobalt (II) chloride ($COCl_2$) were mixed in 200 ml water and sonicated for 15 minutes. A solution of 0.02 g $NaBH_4$ in 20 ml water was added to the mixture. The mixture was stirred for another thirty minutes. The final product ($Pd_4Co/C$) was filtered and washed with an extra 2-3 liters of water.

For 2:1 palladium to cobalt ($Pd_2Co/C$), the above procedure for synthesizing $Pd_4Co/C$ was used, except that 4.6 ml of an aqueous solution of 0.01M $CoCl_2$ and 0.04 g of $NaBH_4$ was used.

Method B (Thermal):

Tetraaminepalladium (II) chloride, $Pd(NH_3)Cl_2 \cdot H_2O$, 23 mg (Alfa Aesar, 99.9%), and 40 mg carbon particles (Vulcan XC-72, E-Tek), were mixed with 40 ml water, sonicated for 15 minutes, and dried at 80° C. The mixture was heated to 400° C. in hydrogen for two hours to reduce the palladium to Pd/C. For 4:1 palladium to cobalt ($Pd_4Co/C$), 50 mg Pd/C and 2.3 ml of an aqueous solution of 0.01M $CoCl_2$ were mixed in 40 ml water, sonicated for 15 minutes, and dried at 80° C. Then the mixture was heated to 400° C. in hydrogen for one hour and annealed at 800° C. for one hour. For 2:1 palladium to cobalt ($Pd_2Co/C$), the above procedure for synthesizing $Pd_4Co/C$ was used, except that 4.6 ml of an aqueous solution of 0.01M $CoCl_2$ was used.

EXAMPLE 2

Rotating Disk Electrode Preparation of Palladium-Cobalt Particles

To prepare an electrode with $Pd_2Co$ nanoparticles, a dispersion of $Pd_2Co$ nanoparticles on carbon substrate ($Pd_2Co/C$) was made by sonicating the $Pd_2Co/C$ nanoparticles in water for about 5-10 minutes to make a uniform suspension. Then, five microliters of this suspension was placed on a glassy carbon disk (GC) electrode and dried in air.

EXAMPLE 3

Electrocatalytic Activity Measurements of Palladium-Cobalt Nanoparticles

The oxygen reduction electrocatalytic activity of palladium-cobalt nanoparticles ($Pd_2Co$) prepared according to Method A of the present invention was compared to the electrocatalytic activity of platinum ($Pt_{10}/C$) nanoparticle catalysts (see FIG. 1). In the polarization curves of FIG. 1, $Pt_{10}C$ refers to a platinum loading concentration of 10 nmol platinum on carbon support. The loading of palladium in $Pd_2Co/C$ was 16 nmol palladium. Polarization curves were measured using a rotating disk electrode, prepared as described in Example 2, operating at 1600 rpm with a sweep rate of 20 mV/s in a 0.1M $HClO_4$ solution.

As shown by the polarization curves in FIG. 1, the activity of the Pd—Co nanoparticles is comparable to the activity of the platinum ($Pt_{10}C$) nanoparticles. For example, both nanoparticles have a half-waver potential of about 0.84V and a very positive potential at the onset of oxygen reduction (i.e., 0.95-1V).

Figure 2:
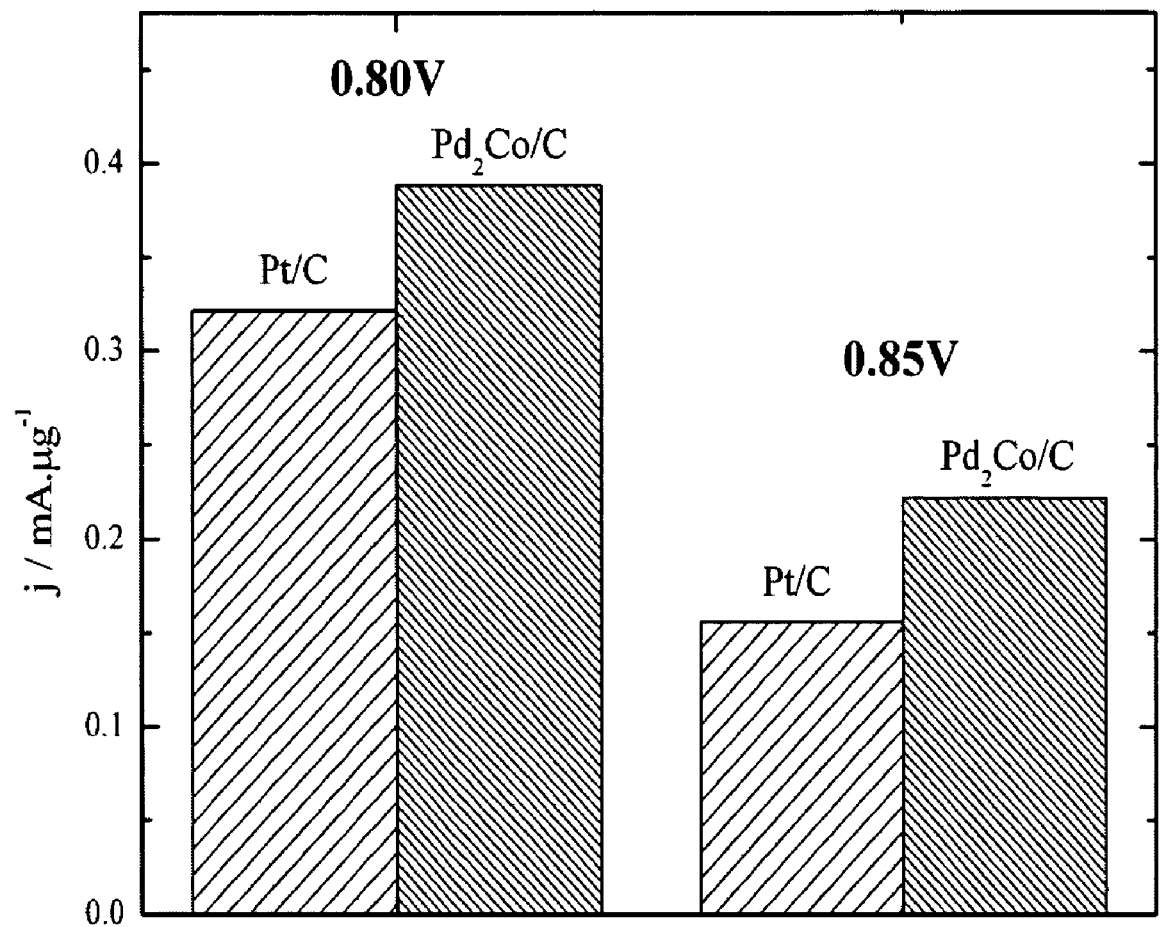
FIG. 2. Mass specific activities of $Pd_2Co$ electrocatalyst compared with a commercial Pt electrocatalyst at potentials of 0.80V and 0.85V.

In addition to the polarization curves, a useful way of comparing the activities of various electrocatalysts is by comparing their mass-specific activities. FIG. 2 compares the Pt mass-specific activities of platinum nanoparticles of 10 nmol Pt loading on carbon support (Pt/C) to the specific activities of palladium-cobalt nanoparticles of 16 nmol Pd loading on carbon support ($Pd_2Co/C$). The left set of bars correspond to the mass-specific activities at 0.80V. The right set of bars correspond to the mass-specific activities at 0.85V. FIG. 2 shows that the palladium-cobalt nanoparticles of the present invention have activity comparable to the platinum nanoparticles.

Figure 3:
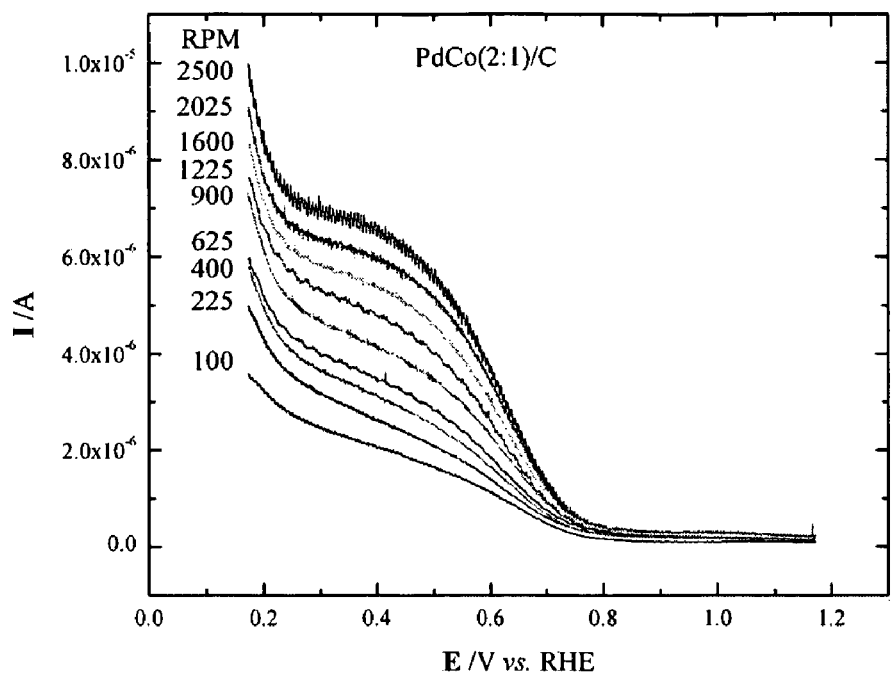
FIG. 3. Polarization curves obtained with a rotating ring disk electrode (RRDE) for oxygen reduction on carbon supported $Pd_2Co$ nanoparticles in 0.1M $HClO_4$ solution.
Figure 3:
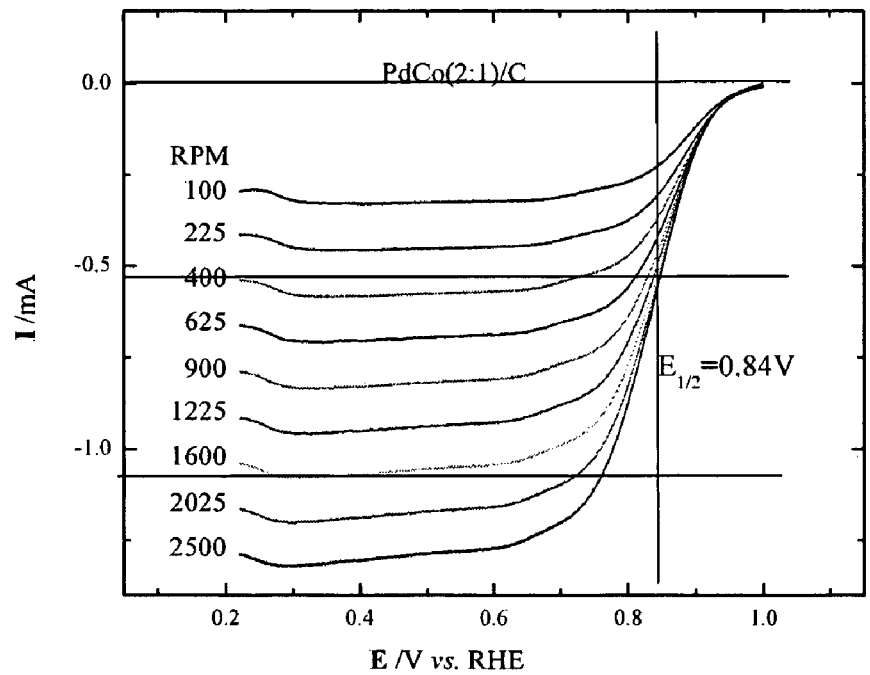

Polarization curves for oxygen reduction were also obtained for $Pd_2Co$ nanoparticles using a rotating ring disk electrode (RRDE) in 0.1M $HClO_4$ solution (see FIG. 3). The curves were generated at a sweeping rate of 20 mV/s, a ring potential of 1.27V, and using ring and disk areas of 0.037 and 0.164 $cm^2$, respectively. Rotation rates (rpm) was varied from 100 to 2500. The polarization curves in FIG. 3 show high activity of the palladium-cobalt nanoparticles. The onset potential of oxygen reduction was about 1.0 V in FIG. 3, and the half-wave potential was about 0.84 V. All these data in FIG. 3 indicated the high activity of the palladium-cobalt nanoparticles. In addition, the polarization curves in FIG. 3 show a small generation of $H_2O_2$ detected at the ring electrode since there were very small currents detected on the ring electrode at low potential range. The detection of $H_2O_2$ confirms the predominantly four-electron reduction of $O_2$ to $H_2O$. The polarization curves for oxygen reduction in FIG. 3 also showed no overlapping between curves and no current decay at high rotating speeds, which indicated that the catalytic property of palladium cobalt nanoparticles for oxygen reduction was very stable.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A fuel cell comprising:
   i) an oxygen-reducing cathode comprised of a ternary alloy composition comprising palladium-cobalt nanoparticles and a transitional metal other than palladium or cobalt, wherein:
      said ternary alloy composition is represented by the formula $Pd_{1-x-y}Co_xM_y$,
      wherein M is a transition metal other than palladium and cobalt;
      x and y each independently have a value of about 0.1 to about 0.9; and
      the sum of x and y is less than 1, and
      said palladium-cobalt nanoparticles are comprised, minimally, of zerovalent palladium and zerovalent cobalt and are bound to an electrically conductive support;
   (ii) an anode;
   (iii) an electrical conductor connecting said oxygen-reducing cathode with said anode; and
   (iv) a proton-conducting medium mutually contacting said oxygen-reducing cathode and said anode; and
   wherein said transition metal is a 3d transition metal.

2. The fuel cell according to claim 1, wherein M is nickel or iron.

3. A fuel cell comprising:
   (i) an oxygen-reducing cathode comprised of a quaternary alloy composition comprised of palladium-cobalt nanoparticles and two metals other than palladium or cobalt wherein said nanoparticles are comprised, minimally, of zerovalent palladium and zerovalent cobalt, and said nanoparticles are bound to an electrically conductive support;
   (ii) an anode;
   (iii) an electrical conductor connecting said oxygen-reducing cathode with said anode; and
   (iv) a proton-conducting medium mutually contacting said oxygen-reducing cathode and said anode.

4. The fuel cell according to claim 3, wherein the palladium-cobalt nanoparticles have a size of about three to ten nanometers.

5. The fuel cell according to claim 4, wherein said quaternary alloy composition is represented by the formula $Pd_{1-x-y-z}Co_xM_yR_z$, wherein M and R each independently represent a metal other than palladium and cobalt; x, y, and z each independently have a value of about 0.1 to about 0.9; and wherein the sum of x, y, and z is less than 1.

6. The fuel cell according to claim 5, wherein M and R each independently represent a transition metal other than palladium and cobalt.

7. The fuel cell according to claim 6, wherein M and R each independently represent a 3d transition metal other than palladium and cobalt.

8. The fuel cell according to claim 7, wherein M represents nickel and R represents iron.

* * * * *

UNITED STATES PATENT AND TRADEMARK OFFICE
CERTIFICATE OF CORRECTION

| | | |
|---|---|---|
| PATENT NO. | : 7,632,601 B2 | Page 1 of 1 |
| APPLICATION NO. | : 11/054587 | |
| DATED | : December 15, 2009 | |
| INVENTOR(S) | : Radoslav Adzic | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this
Third Day of May, 2011

David J. Kappos
*Director of the United States Patent and Trademark Office*